(12) United States Patent
Kurosawa et al.

(10) Patent No.: US 10,981,681 B2
(45) Date of Patent: Apr. 20, 2021

(54) FILLING/SEALING DEVICE FOR CONTAINER

(71) Applicants: TOYO SEIKAN CO., LTD., Tokyo (JP); MITSUBISHI HEAVY INDUSTRIES MACHINERY SYSTEMS, LTD., Hyogo (JP)

(72) Inventors: Kazuyuki Kurosawa, Tokyo (JP); Hidehiko Yuse, Tokyo (JP); Shinichi Hizume, Kobe (JP); Shinji Ishikura, Kobe (JP)

(73) Assignees: TOYO SEIKAN CO., LTD., Tokyo (JP); MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 0 days.

(21) Appl. No.: 15/542,757

(22) PCT Filed: Dec. 16, 2015

(86) PCT No.: PCT/JP2015/085212
§ 371 (c)(1),
(2) Date: Jul. 11, 2017

(87) PCT Pub. No.: WO2016/114062
PCT Pub. Date: Jul. 21, 2016

(65) Prior Publication Data
US 2018/0002042 A1  Jan. 4, 2018

(30) Foreign Application Priority Data

Jan. 15, 2015  (JP) .............................. JP2015-006267

(51) Int. Cl.
*B65B 3/34* (2006.01)
*B67C 3/28* (2006.01)
(Continued)

(52) U.S. Cl.
CPC ................. *B65B 3/28* (2013.01); *B65B 3/30* (2013.01); *B65B 3/34* (2013.01); *B65B 57/10* (2013.01);
(Continued)

(58) Field of Classification Search
CPC ...................................................... G01G 15/00
See application file for complete search history.

(56) References Cited

U.S. PATENT DOCUMENTS 5,538,054 A   7/1996  Luhmann et al.
6,009,001 A  12/1999  Otake
(Continued)

FOREIGN PATENT DOCUMENTS

CN     103057731 A     4/2013
DE   102012000758 A1   7/2013
(Continued)

OTHER PUBLICATIONS

Original and Translation of EP 2583931 A1; Angerer, Florian; Apr. 24, 2013.*
(Continued)

*Primary Examiner* — Paul J Gray
(74) *Attorney, Agent, or Firm* — Greenblum & Bernstein, P.L.C.

(57) ABSTRACT

A filling device with a filling failure is identified less costly, and the filling amount by the filling device is adjusted quickly. The filling/sealing device includes a filler including a filling turret having a plurality of holding parts and a filling device provided for each of the holding parts to fill a container with a liquid content, forwarding turrets that hold and turret-convey a container transported from the filling turret, a sealing device that seals the container transported from the forwarding turrets with a lid, an inspection device provided in the path, in which the container is held and (Continued)

turret-conveyed, to inspect a filling amount in the container, and a controller that identifies a filling device with a filling failure on the basis of an inspection result from the inspection device and controls the filling amount by the filling device.

13 Claims, 2 Drawing Sheets

(51) Int. Cl.
    *B65B 7/10*     (2006.01)
    *B65B 3/28*     (2006.01)
    *B65B 57/14*     (2006.01)
    *B67C 3/20*     (2006.01)
    *B65B 57/10*     (2006.01)
    *B65B 3/30*     (2006.01)
    *G01G 15/00*     (2006.01)

(52) U.S. Cl.
    CPC ............... *B65B 57/14* (2013.01); *B67C 3/20* (2013.01); *B67C 3/202* (2013.01); *B67C 3/28* (2013.01); *B67C 3/284* (2013.01); *G01G 15/00* (2013.01); *B67C 3/282* (2013.01)

(56) References Cited

U.S. PATENT DOCUMENTS

2004/0159697 A1* 8/2004 Turner ............... B21D 51/2653
                                                228/124.6
2014/0360621 A1* 12/2014 Clusserath ............ B67C 3/202
                                                141/9

FOREIGN PATENT DOCUMENTS

| EP | 2583931 A1 | 4/2013 |
|---|---|---|
| JP | 03-175323 A | 7/1991 |
| JP | 7-125705 | 5/1995 |
| JP | 2791809 | 8/1998 |
| JP | 2002-362519 | 12/2002 |
| JP | 2006-240659 | 9/2006 |
| JP | 4-832607 | 12/2011 |
| JP | 6009001 | 10/2016 |

OTHER PUBLICATIONS

Original and Translation of JPH03175323 A; Takahashi, Toru; Jul. 30, 1991.*
Extended European Search Report for corresponding European patent application No. 15878013.0 dated Sep. 13, 2018.
Office action for corresponding Chinese patent application No. 201580073581.4 dated Sep. 28, 2018.
InternationalSearch Report issued in Patent Application No. PCT/JP2015/085212, dated Mar. 22, 2016.
International Preliminary Examination Report in PCT/JP2015/085212 dated Mar. 22, 2016.
Written Opinion of the International Searching Authority in PCT/JP2015/085212 dated Mar. 22, 2016 with English translation thereof.
Indonesian Office Action conducted in counterpart Appln. No. P00201705245 (w/ English translation).
Chinese Office Action conducted in counterpart Appln. No. 201580073581 (w/ English translation).
Thailand Office Action conducted in counterpart Thailand Appln. No. 1701003880 (dated May 17, 2019) (w/ English translation).
India Office Action conducted in counterpart India Appln. No. 201737021984 (dated Jul. 15, 2019) (w/ English translation).
English translation of Chinese Office Action conducted in counterpart Appln. No. 201580073581 dated May 25, 2020.
European Office Action dated May 15, 2020 and conducted in EP counterpart Appln. No. 15 878 013.0.
Chinese Office Action conducted in counterpart Appln. No. 201580073581 dated Mar. 25, 2020.

* cited by examiner

FILLING/SEALING DEVICE FOR CONTAINER

TECHNICAL FIELD

The present invention relates to a filling/sealing device for a container that fills the container with a content and seals the container.

BACKGROUND ART

A conventional filling/sealing device that fills a container with a liquid content such as a beverage is provided with a series of lines in which a container such as a can made of a metal material is filled with a content by a filler while being moved by a conveyer, and then sealed with a lid (metal lid) by seaming using a seamer, and whether the liquid content is filled up to a prescribed liquid level is inspected by an X-ray liquid quantity inspection device. Moreover, a device has also been suggested that can determine which filler valve has a filling failure if a failure is detected as a result of inspection in a line including such a liquid quantity inspection device (see PTL 1).

CITATION LIST

Patent Literature

[PTL 1]
Japanese Patent Application Publication No. 2002-362519

SUMMARY OF INVENTION

Technical Problem

In the conventional filling/sealing device, if a failure detected as a result of inspection by the liquid quantity inspection device is caused by a filling valve in the filler, and the filler continues to operate, defective products continue to be produced, and therefore the valve responsible for the failure must be identified and adjusted quickly. However, the conventional device has a linear intermediate conveyance path between, e.g., the filler and the seamer, and it is difficult to accurately keep track of the conveyance situation of containers from a carrying-out position of the filler to the liquid quantity inspection device.

To this end, according to the above-described conventional configuration, a plurality of detectors adapted to recognize passage of containers are provided in the conveyance path from the filler to the liquid quantity inspection device, so that the conveyance situations of the containers in respective locations are grasped on the basis of signals from the detectors provided in the locations. According to the conventional configuration, many detectors must be provided in order to determine which valve in the filler has a filling failure, and high equipment cost is necessary. Furthermore, if a valve having a filling failure is determined, the operation of the filler must be stopped to carry out valve adjustment in order to solve the filling failure, which inevitably lowers the productivity.

The present invention is for example directed to a solution to the problems. More specifically, an object of the present invention is to identify a filling device with a filling failure in a filler, quickly adjust a filling amount by the filling device, and suppress a reduction in the productivity without a heavy equipment cost in a filling/seaming device for a container that fills the container with a content such as a beverage and seals an opening part of the container.

Solution to Problem

In order to achieve the object, a filling/sealing device for a container according to the present invention includes the following feature.

A filling/sealing device for a container includes a filler including a filling turret having a plurality of container holding parts and a filling device provided for each of the holding parts to fill the container with a liquid content, a forwarding turret that holds and turret-conveys the container transported from the filling turret, a sealing device that seals the container transported from the forwarding turret with a lid, an inspection device provided in a path, in which the container is held and turret-conveyed, to inspect a filling amount in the container, and a controller that identifies the filling device with a filling failure on the basis of an inspection result from the inspection device and controls a filling amount by the filling device.

Advantageous Effects of Invention

In the filling/sealing device for a container of the present invention having the feature, turret conveyance with a previously specified number of conveyance pitches is carried out from the filler to the inspection device, so that when a filling failure is detected as an inspection result, the filling device with the filling failure in the filler can be identified without sequentially keeping track of the conveyance states of the containers. The controller controls the filling amount by the identified filling device, and therefore a subsequent filling failure can quickly be solved without stopping the operation of the filler.

DESCRIPTION OF EMBODIMENTS

Figure 1:
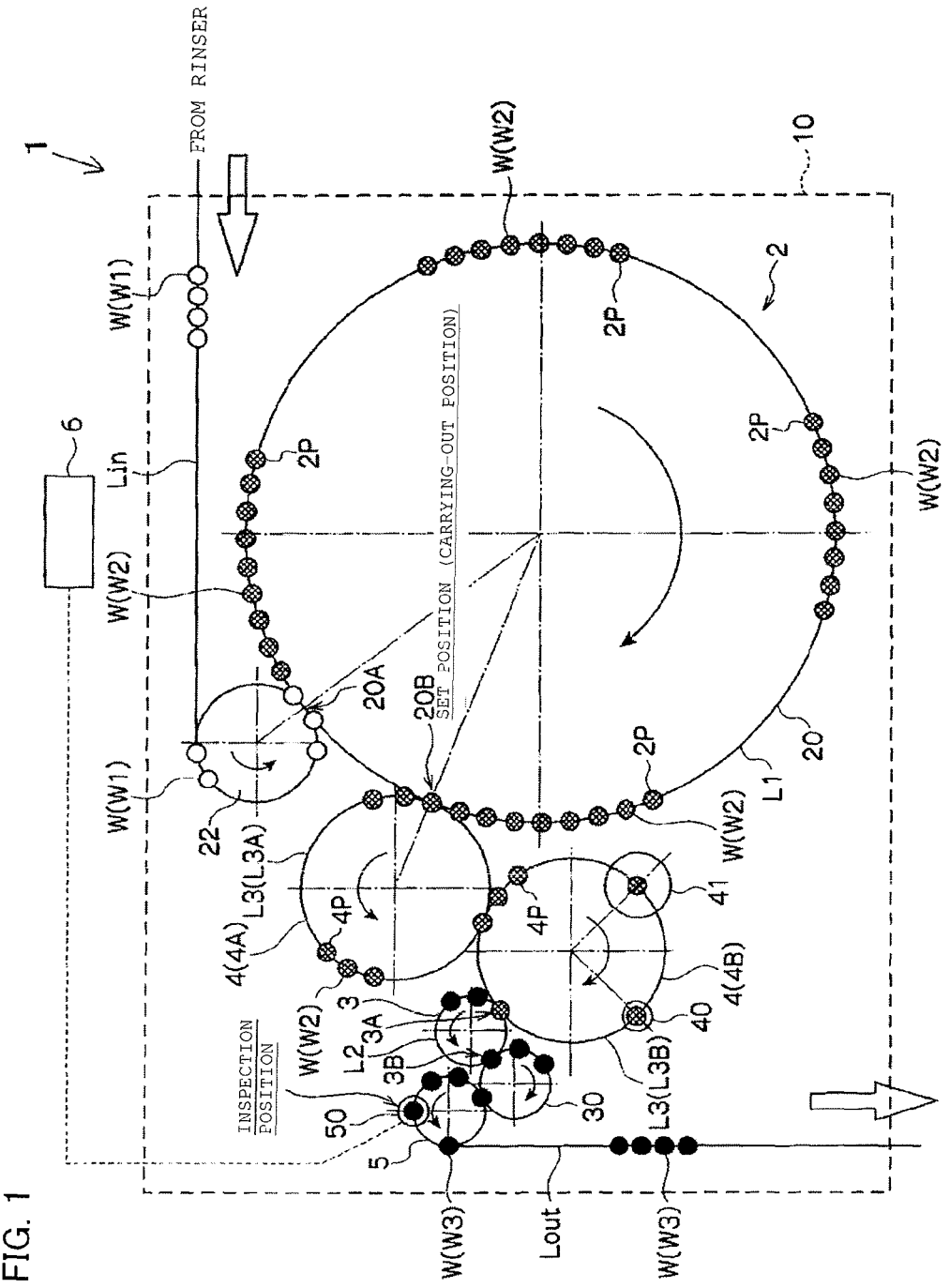
FIG. 1 is a view for illustrating an overall configuration of a filling/sealing device for a container according to an embodiment of the present invention.
Figure 2:
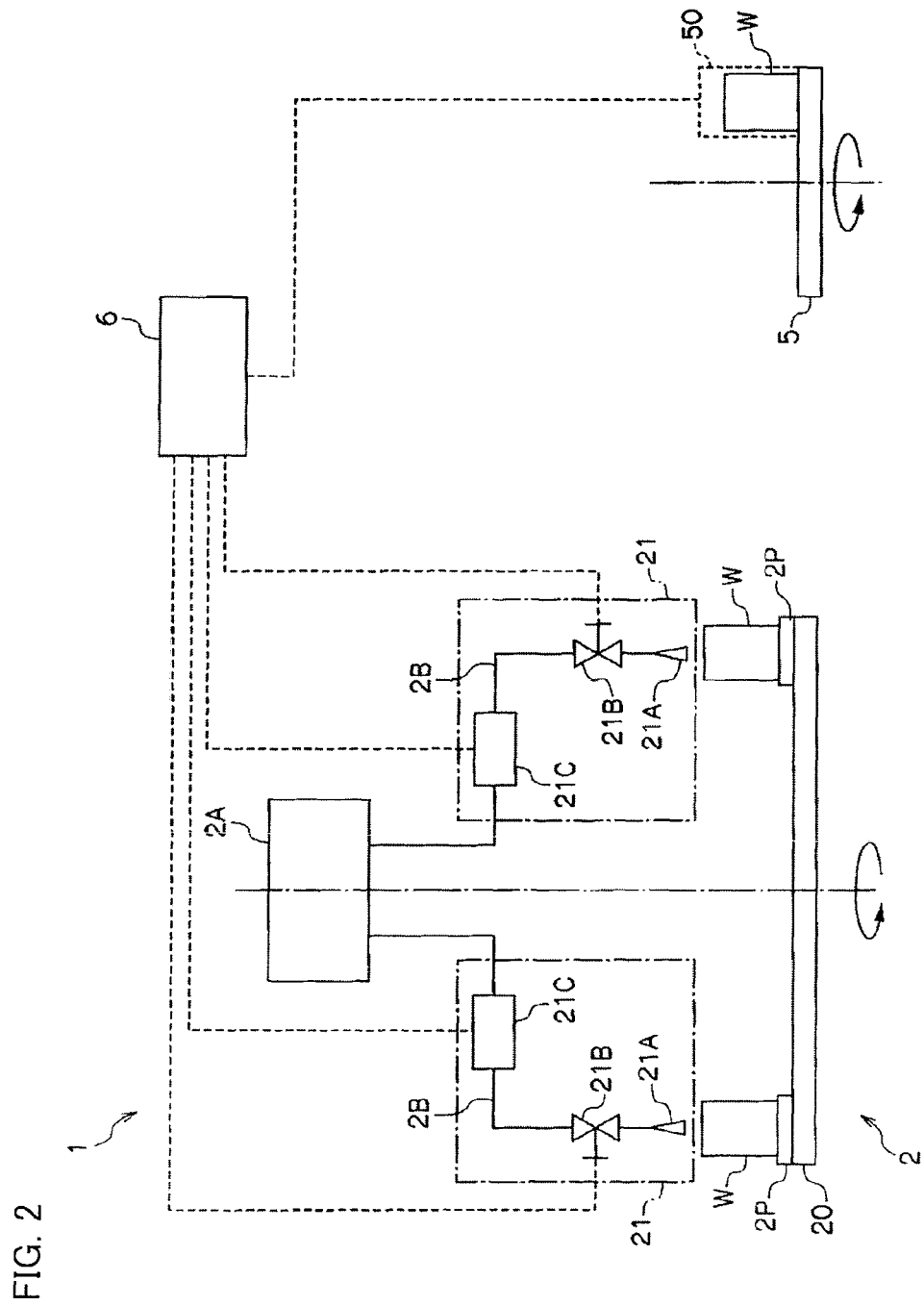
FIG. 2 is a view for illustrating a system configuration of a filling/sealing device for a container according to the embodiment of the present invention.

An embodiment of the present invention will be described with reference to the accompanying drawings. In FIG. 1 and FIG. 2, a filling/sealing device 1 for a container according to the embodiment of the present invention includes a filler 2 including a filling device 21 that fills a container W with a liquid content, a sealing device 3 that seals the container W with a lid, an inspection device 50 that inspects a filling amount in the container W, and a controller 6 that controls a filling amount by the filling device 21.

The container W to be described herein is a can made of a metal material, and the sealing device 3 is a seamer that attaches a lid (metal lid) to a flange part formed at an open end of the can by double-seaming by roll processing by way of illustration, but the form of the container W and the form of the sealing device 3 are not limited to the above. Note that as for the shown containers W, W1 designates an empty can, W2 designates a can in the process of being filled with a liquid content such as a beverage or already filled with the content, and W3 designates a can sealed by double-seaming.

The filler 2 includes a filling turret 20 and fills a can W with a liquid content while conveying the can W by rotation of the filling turret 20. The filling turret 20 includes a plurality of holding parts (pockets) 2P that hold cans W at its circular outer circumference, and the holding parts 2P are arranged at a set conveyance pitch in a circular conveyance path L1.

A filling device 21 that moves in synchronization with each of the holding parts 2P is provided above the holding part 2P. The filling device 21 includes a filling nozzle 21A, a filling valve 21B, and a flowmeter 21C and fills the can W with a liquid content from a filling tank 2A through a filling flow passage 2B between the carrying-in position 20A and the carrying-out position 20B of the filling turret 20.

The can W (empty can W1) is supplied to the filler 2 from a rinser that cleans the can W through an appropriate carrying-in path $L_{in}$. During the process, a carrying-in turret 22 that receives and delivers the cans W to the holding parts 2P of the filling turret 20 as shown may be provided or the carrying-in turret 22 may be additionally provided with a rinser turret (not shown) that cleans the cans W.

The sealing device (seamer) 3 seals the can W by subjecting the flange part of the can W and the curled part of a lid to double-seaming by roll processing while the can W having the lid (metal can) placed thereon is conveyed from a carrying-in position 3A to a carrying-out position 3B along a circular conveyance path L2. A prescribed conveyance pitch is set as appropriate in the circular conveyance path L2 of the sealing device 3.

Two forwarding turrets 4A and 4B that hold and turret-convey the can W transported from the filling turret 20 are provided between the filler 2 and the sealing device 3. The can W transported to the forwarding turrets 4A and 4B from the filling turret 20 is held at a holding part (pocket) 4P provided per prescribed conveyance pitch. The forwarding turret 4 is provided between the carrying-out position 20B of the filling turret 20 and the carrying-in position 3A to the sealing device 3, and the can W filled with a content is turret-conveyed along a circular conveyance path L3 (L3A, L3B).

In the illustrated example, a lid supply part 40 is provided in the circular conveyance path L3B of the forwarding turret 4B. The lid supply part 40 may be a lid supply device directly provided in the circular conveyance path L3B or an additional lid supply turret may be provided at the lid supply part 40 in the circular conveyance path L3B. In the illustrated example, a liquid nitrogen filling part 41 that fills the can W with liquid nitrogen is provided in the circular conveyance path L3B of the forwarding turret 4.

Note that although not shown, only one forwarding turret 4 may be provided, and when one forwarding turret 4 is provided, the lid supply part 40 and the liquid nitrogen filling part 41 are provided in the circular conveyance path L3 thereof.

The inspection device 50 is provided in the path in which the can W transported from the sealing device 3 is held and turret-conveyed and inspects the amount of liquid content filled in the can W. In the illustrated example, the can W carried out from the sealing device 3 is held by a discharging turret 30, then held by an inspection turret 5, and carried outside the device via an appropriate carrying-out path $L_{out}$. The inspection device 50 is provided in an inspection position in the conveyance path of the inspection turret 5. The inspection device 50 may be a device that detects the weights of the can W and the content and outputs the weights as an inspection result or a device that detects the liquid level in the can W and outputs the level as an inspection result.

The inspection device 50 may be provided in the circular conveyance path of the forwarding turret 4, and when two forwarding turrets 4 are provided, the device may be provided in the circular conveyance path of one of the forwarding turrets 4A and 4B.

When the filling amount is inspected on a weight basis, before the can W1 (empty can) is delivered to the filling turret 20 of the filler 2, the weight (V1) of the can W1 is measured for example on the carrying-in turret 22, the weight (V2) of the can W2 after the filling may be measured with the inspection device 50 in the circular conveyance path of the forwarding turret 4, and the net filling amount (weight of the content) may be obtained as the difference V2−V1 and output as an inspection result in order to improve the inspection accuracy for the amount of the liquid content filled in the can W.

The controller 6 identifies a filling device 21 with a filling failure on the basis of the inspection result from the inspection device 50 and controls the filling amount by the filling device 21. The controller 6 recognizes in advance a specific number of conveyance pitches set between a set position (such as the carrying-out position 20B) of the filling turret 20 and the inspection position of the inspection device 50. In the filling/sealing device 1, turret conveyance at a specified conveyance pitch is carried out for the entire conveyance path from the filler 2 to the inspection device 50. In this way, a specific conveyance pitch number is set between the set position (carrying-out position 206) of the filling turret 20 and the inspection position of the inspection device 50.

The controller 6 recognizes the specific conveyance pitch number and therefore can identify the filling device 21 with a filling failure less costly without sequentially keeping track of the conveyance process of the cans W. More specifically, when the can W inspected by the inspection device 50 is discovered having a filling failure and the inspection result is obtained in the inspection position, the holding part 2P in a position a prescribed number of conveyance pitches ahead of the set position (carrying-out position 20B) in the filling turret 20 is identified, and it can be determined that the filling device 21 corresponding to the holding part 2P has a filling failure.

The controller 6 controls the filling amount by the filling device 21 to an appropriate value upon identifying the filling device 21 with the filling failure. An example of the control will be described.

The filling device 21 measures the flowrate of a liquid content passed through the filling flow passage 2B with a flowmeter 21C and adds up to obtain the total amount filled in the can W1. The moment the flowrate integrated value attains a prescribed value, the controller 6 transmits a valve closing instruction for the filling valve 21B. After receiving the valve closing instruction and a practically unavoidable operation delay, the filling valve 21B closes and the filling to the can W1 is complete. More specifically, a prescribed flowrate integrated value at which the valve closing instruction is transmitted is set to be smaller than a desired target filling amount for the can W1. In the event of a filling failure, the flowrate integrated value at which the valve closing instruction is issued is adjusted, so that the filling amount can be quickly corrected to an appropriate amount.

Now, another example of the control for carrying out filling without using the flowmeter 21C will be described. The filling device 21 sets the opening time of the filling valve 21B to a prescribed value, which is empirically obtained in advance, so that the filling amount for the can W1 is constant. More specifically, when the controller 6 transmits a valve opening instruction, the filling valve 21B is opened and the filling starts. After a prescribed period, a valve closing instruction is transmitted, and the filling valve 21B is closed. Normally, the containers are always filled with a constant amount by the method. However, when the liquid level in the filling tank 2A or the pressure in the tank changes, or when the operation response time by the filling valve 21B changes, the filling amount changes, and a filling failure may be caused. In the event of such a filling failure, the opening time of the filling valve may be adjusted to an appropriate value, so that correction to an appropriate filling amount can quickly be carried out.

In yet another example of the control, in the filling device 21, while the filling amount for the can W1 is controlled on the basis of the filling time (valve opening time) of the filling valve 21B, the weight (V1) of the can W1 to be supplied to the filler 2 is measured before filling, the weight (V2) of the can W2 after filling is measured using the inspection device 50 in the circular conveyance path of the forwarding turret 4, and an actual filling amount is obtained from the difference V2−V1. Then, the flowrate (ml/sec) per unit time by the filling device 21 is obtained from the actual filling amount and the filling time, and if the difference between the actual filling amount and the preset target filling amount should be corrected, the controller 6 calculates corrected filling time on the basis of the differential value, feeds back the result to the filling time, and controls the filling amount by the filling device 21 at an appropriate amount, so that correction to the appropriate filling amount can quickly be carried out. According to this control example, the flowmeter in the previous example is not necessary, and the number of components for the filling device 21 may be reduced, and a simplified configuration may be achieved.

Note that the method of controlling the filling amount to an appropriate amount in the event of a filling failure is not limited to the above control examples, and any other known arbitrary means may be employed to achieve the control.

As described above, in the filling/sealing device 1 according to the embodiment, turret conveyance with a previously specified number of conveyance pitches is carried out from the filler 2 to the inspection device 50, so that when a filling failure is detected as an inspection result, the defective filling device 21 in the filler 2 can easily be identified. Since the filling amount by the identified filling device 21 is controlled by the controller 6, a subsequent filling failure may quickly be solved without stopping the operation of the filler 2.

In the filling/sealing device 1, the filler 2 and the sealing device 3 are coupled by the forwarding turrets 4A and 4B, so that the filler 2 and the sealing device 3 may be integrated in a compact arrangement through the forwarding turrets 4A and 4B. In this way, the filler 2, the sealing device 3, and the forwarding turrets 4A and 4B may be provided on a common frame 10. When the filling/sealing device 1 is produced with the common frame 10, works related to assembly wiring and test run adjustment in the installed state may be finished in advance, and therefore the time for installation works may be reduced.

The conveyance of the cans W from the filler 2 to the inspection device 50 is carried out by the turret conveyance in which all the conveyance pitches are accurately determined, so that the process is not influenced by change with time that would be caused by the expansion of a chain used in linear conveyance, and positional adjustment and timing adjustment that would otherwise be necessary in transport from the filler 2 to the forwarding turret 4 and transport from the forwarding turret 4 to the sealing device 3 can be abolished.

While the embodiment of the invention has been described in detail with reference to the drawings, the specific configurations of the embodiments should not be construed as limiting, and design changes and the like without departing from the gist of the invention are covered by the invention.

REFERENCE SIGNS LIST

1 Filling/sealing device
2 Filler
20 Filling turret
20A Carrying-in position
20B Carrying-out position (set position)
21 Filling device
21A Filling nozzle
21B Filling valve
21C Flowmeter
2A Filling tank
2B Filling flow passage
22 Carrying-in turret
3 Sealing device (seamer)
3A Carrying-in position
3B Carrying-out position
30 Discharging turret
4 Forwarding turret
40 Lid supply part
41 Liquid nitrogen filling part
5 Inspection turret
50 Inspection device
6 Controller
10 Common frame
W Container (can)
L1, L2, L3 (L3A, L3B) Circular conveyance path
$L_{in}$ Carrying-in path
$L_{out}$ Carrying-out path
2P, 4P Holding part (pocket)

The invention claimed is:

1. A filling/sealing device for a container that is configured to quickly correct a filling amount when a filling failure is identified, comprising:
a filler including a filling turret having a plurality of holding parts and a filling device provided for each of the holding parts to fill the container with a liquid content;
a forwarding turret that holds and turret-conveys the container after being transported onto the forwarding turret from a carrying-out position of said filling turret;
a sealing device arranged downstream of the forwarding turret and that seals the container with a lid after being transported from said forwarding turret;
an inspection device arranged downstream of the sealing device and provided in a path, in which said container is held and turret-conveyed, to inspect at an inspection position a total liquid filling amount in the container while the container is turret-conveyed and after the container is sealed with the lid by the sealing device; and
a controller communicating with the inspection device and the filler and that:
recognizes in advance a specific number of conveyances pitches between the carrying-out position of the filling turret and the inspection position of the inspection device; and
identifies the filling device corresponding to one of the holding parts with a filling failure on the basis of an inspection result from said inspection device and controls a filling amount by the filling device that corresponds to the one of the holding parts having the filling failure, wherein the filling/sealing device is configured to correct the filling amount without stopping operation of the filler and utilizes only a single filling turret to fill the container when empty in a conveyance path between a carrying-in position of the filler and the sealing device.

2. The filling/sealing device for a container according to claim 1, wherein said inspection device is provided at an inspection turret that holds and turret-conveys the container transported from the sealing device.

3. The filling/sealing device for a container according to claim 1, wherein said inspection device is provided at the forwarding turret that holds and turret-conveys the container transported from the filling turret.

4. The filling/sealing device for a container according to claim 1, wherein said controller identifies said holding part in a position said prescribed number of conveyance pitches ahead of said set position in said filling turret upon obtaining the inspection result in said inspection position, and controls the filling amount by said filling device provided at said identified holding part.

5. The filling/sealing device for a container according to claim 1, wherein said controller controls the filling amount by adjusting a valve opening time in said filling device.

6. The filling/sealing device for a container according to claim 1, wherein said controller controls the filling amount by calculating corrected filling time from a difference between an actual filling amount and a preset target filling amount and feeding back the result to the filling time.

7. The filling/sealing device for a container according to claim 1, wherein the inspection result from said inspection device is output on the basis of inspection of weights of the container and the content, a weight of the content, or a liquid level in the container.

8. The filling/sealing device for a container according to claim 1, wherein said sealing device is a seamer that attaches the lid to a flange part of a can serving as the container by double-seaming by roll-processing.

9. The filling/sealing device for a container according to claim 1, wherein the container is weighed before reaching the filling turret.

10. The filling/sealing device for a container according to claim 1, wherein the container is inspected by the inspection device downstream of the sealing device.

11. A filling/sealing device for a container that is configured to quickly adjust a filling amount when a filling failure is identified, comprising:
a filler including a filling turret having a plurality of holding parts and a filling device provided for each of the holding parts to fill the container with a liquid content so that the container is provided with a total filling amount;
a forwarding turret that holds and turret-conveys the container transported from said filling turret;
a sealing device arranged downstream of the forwarding turret and that seals the container with a lid after being transported from said forwarding turret;
an inspection device arranged downstream of the sealing device and provided in a path, in which said container that has been sealed by the sealing device is held and turret-conveyed, to inspect the total liquid filling amount in the container while the container is turret-conveyed; and
a controller that:
recognizes in advance a specific number of conveyances pitches between a carrying-out position of the filling turret and an inspection position of the inspection device;
identifies the filling device corresponding to one of the holding parts with a filling failure on the basis of an inspection result from said inspection device without stopping operation of the filler; and
controls, without stopping operation of the filler, the total liquid filling amount by the filling device that corresponds to the one of the holding parts identified with the filling failure,
wherein the filling turret is configured to fill an empty container with the liquid before the container is transported to the forwarding turret from the filling turret and said filling turret is arranged in a conveyance path between a carrying-in position of the filler and the sealing device.

12. A filling/sealing device for a container that is configured to quickly adjust a filling amount when a filling failure is identified, comprising:
a filler including a filling turret having a plurality of holding parts and a filling device provided for each of the holding parts to fill an empty container with a liquid content so that the container is provided with a total filling amount;
a forwarding turret that holds and turret-conveys the filled container transported from said filling turret;
a sealing device arranged downstream of the forwarding turret and that seals the filled container with a lid after being transported from said forwarding turret;
an inspection device arranged downstream of the sealing device and provided in a path, in which said filled container that has been sealed by the sealing device is held and turret-conveyed, to inspect the total liquid filling amount in the sealed filled container; and
a controller communicating with the filler and the inspection device and that:
recognizes in advance a specific number of conveyances pitches between a carrying-out position of the filling turret and an inspection position of the inspection device;
identifies said filling device that corresponds to the one of the holding parts with a filling failure on the basis of an inspection result from said inspection device without stopping operation of the filler; and
adjusts, without stopping operation of the filler, the total liquid filling amount by the filling device that corresponds to the one of the holding parts identified with the filling failure, whereby the total liquid filling amount is corrected for the filling device that corresponds to the one of the holding parts identified with the filling failure.

13. A filling/sealing device for a container that is configured to quickly correct a filling amount when a filling failure is identified, comprising:
a filler including a filling turret having a plurality of holding parts and a filling device provided for each of the holding parts to fill the container with a liquid content;
a forwarding turret arranged downstream of the filler and that holds and turret-conveys the container after being transported onto the forwarding turret from a carrying-out position of said filling turret;
a liquid nitrogen filling part provided in a circular conveyance path of the forwarding turret and that fills the container with liquid nitrogen;

a sealing device arranged downstream of the forwarding turret and that seals the container with a lid after being transported from said forwarding turret;

an inspection device arranged downstream of the sealing device and provided in a path, in which said sealed container is held and turret-conveyed, to inspect at an inspection position a total liquid filling amount in the container provided by the filler and the liquid nitrogen filling part; and a controller communicating with the inspection device and the filler and that:
recognizes in advance a specific number of conveyances pitches between the carrying-out position of the filling turret and the inspection of the inspection device; and
identifies said filling device that corresponds to one of the holding parts with a filling failure on the basis of an inspection result from said inspection device and corrects a filling amount by the filling device that corresponds to the one of the holding parts and without stopping operation of the filler, wherein the filling/sealing device utilizes only a single filling turret to fill the container when empty in a conveyance path between a carrying-in position of the filler and the sealing device.

* * * * *